US012070967B1

(12) United States Patent
Yan

(10) Patent No.: US 12,070,967 B1
(45) Date of Patent: Aug. 27, 2024

(54) SYSTEMS AND METHODS FOR REPRODUCTION OF DRAWINGS

(71) Applicant: Lori Yan, Palo Alto, CA (US)

(72) Inventor: Lori Yan, Palo Alto, CA (US)

(73) Assignee: Lori Yan, Palo Alto, CA (US)

( * ) Notice: Subject to any disclaimer, the term of this patent is extended or adjusted under 35 U.S.C. 154(b) by 0 days.

(21) Appl. No.: 18/314,072

(22) Filed: May 8, 2023

(51) Int. Cl.

*B43K 23/06* (2006.01)
*B43K 29/00* (2006.01)
*B43L 13/02* (2006.01)
*B44D 3/22* (2006.01)

(52) U.S. Cl.

CPC ............ *B43K 23/06* (2013.01); *B43K 29/004* (2013.01); *B44D 3/22* (2013.01); *B43L 13/028* (2013.01)

(58) Field of Classification Search

CPC ...... B43K 23/06; B43K 27/04; B43K 29/004; B43K 29/18; B43L 13/028; B43L 13/12; B43L 9/02; B43L 9/08; B43L 9/12; B43L 9/14; B43L 9/16; B43L 9/20; B43L 9/22
USPC ........................................................ 401/34–35
See application file for complete search history.

(56) References Cited

U.S. PATENT DOCUMENTS 191,611 A * 6/1877 Peel .......................... B43L 9/02 33/27.02
376,379 A * 1/1888 Hanower .................. B43L 9/02 33/27.02
612,339 A * 10/1898 Hearing .................. B43L 13/12 33/23.06
752,699 A * 2/1904 Peter ......................... B43L 9/02 401/52
967,267 A * 8/1910 Thompson ................ B43L 9/08 33/558.02
1,564,908 A * 12/1925 Sorensen .................. B43L 9/02 7/164
2,510,302 A * 6/1950 White .................. B43K 23/001 D19/135
2,515,566 A * 7/1950 Neft .................... B43L 19/0062 403/191
2,896,576 A * 7/1959 Baer ....................... B43K 29/18 7/118

(Continued)

OTHER PUBLICATIONS

Hutchison, Patrick; "Kid Craft of the Week: Pencil Catapult" published Sep. 25, 2021; captured on Oct. 17, 2021; https://www.artofmanliness.com/skills/how-to/kid-craft-of-the-week-pencil-catapult/ (Year: 2021).*

*Primary Examiner* — David P Angwin
*Assistant Examiner* — Bradley S Oliver
(74) *Attorney, Agent, or Firm* — Sheppard Mullin Richter & Hampton LLP

(57) ABSTRACT

Provided is a system and method for replicating drawings or carvings. The system includes three drawing or carving instruments. The three drawing or carving instruments are attached to one another via a fastener between each pair of drawing or carving instruments. A first tip of a first drawing or carving instrument is oriented between 0 and 180 degrees with respect to a second tip of a second drawing or carving instrument. A third tip of a third drawing or carving instrument is oriented between 0 and 180 degrees with respect to the first tip of the first drawing or carving instrument and with respect to the second tip of the second drawing or carving instrument. A first plane defined by the first tip and the second tip is non-coplanar with a second plane defined by the first tip and the third tip.

11 Claims, 7 Drawing Sheets

(56) References Cited

U.S. PATENT DOCUMENTS

| | | | | | |
|---|---|---|---|---|---|
| 2,968,098 | A * | 1/1961 | Collin | B43L 9/12 33/41.5 |
| 3,537,181 | A * | 11/1970 | Graef | B43L 9/02 33/27.02 |
| 3,721,008 | A * | 3/1973 | Frank | B43L 13/12 33/41.5 |
| 4,738,558 | A * | 4/1988 | Hiromori | B43K 7/005 401/35 |
| 5,263,259 | A * | 11/1993 | Cimador | B43L 13/208 401/35 |
| 5,630,278 | A * | 5/1997 | Stoneberg | B43L 9/16 33/27.02 |
| 5,651,184 | A * | 7/1997 | Tutty | B25H 7/005 33/529 |
| D403,355 | S * | 12/1998 | Fillion | D19/120 |
| 5,865,552 | A * | 2/1999 | Manno | B43K 25/026 401/52 |
| 6,663,305 | B2 * | 12/2003 | Poulos | B43K 23/02 D19/135 |
| 6,802,665 | B2 * | 10/2004 | Brown | B43K 23/06 401/48 |
| 2005/0074269 | A1 * | 4/2005 | Asselin | B43K 23/06 401/131 |
| 2007/0261174 | A1 * | 11/2007 | Barker | B26B 5/002 7/158 |
| 2008/0025784 | A1 * | 1/2008 | Mueller | B43K 27/08 401/34 |
| 2008/0159803 | A1 * | 7/2008 | Bouveresse | B43K 19/00 401/34 |
| 2016/0310865 | A1 * | 10/2016 | Won | B43K 23/06 |
| 2017/0232781 | A1 * | 8/2017 | Nguyen | F16B 2/22 24/341 |
| 2018/0304672 | A1 * | 10/2018 | Mueller | B43K 23/06 |

* cited by examiner

SYSTEMS AND METHODS FOR REPRODUCTION OF DRAWINGS

The present disclosure relates generally to reproduction of drawings onto one or more drawings surfaces.

BACKGROUND

Currently, mechanisms of manually reproducing drawings may require redrawing or retracing, resulting in not only imprecise replications but also additional replication of effort and consumption of time. Accordingly, manually reproducing or replicating drawings seamlessly would be a boon for any sketching or drawing-related applications.

SUMMARY

Described herein are systems and methods for reproducing or replicating drawings manually.

In some embodiments, the systems may include a plurality of writing or drawing utensils or instruments, wherein the writing or drawing utensils or instruments include any of a pencil, a pen, a marker, or a brush. The writing utensils or instruments (hereinafter "writing instruments" or "writing instrument") may be attached or fastened to one another using any attachment or fastening mechanism, such as a rubber band, a spring, tape, or a pin.

In some embodiments, a first tip (e.g., a writing tip) of a first writing instrument may be oriented between 0 and 180 degrees with respect to a second tip of a second writing instrument.

In some embodiments, a third tip of a third writing instrument may be oriented between 0 and 180 degrees with respect to a first tip of the first writing instrument or a second tip of the second writing instrument. The third tip of the third writing instrument may be disposed non-coplanar with a plane defined by the first tip of the first writing instrument and the second tip of the second writing instrument.

In some embodiments, at least a portion of the third writing instrument may traverse, or be attached between, non-writing ends of the first writing instrument and a second writing instrument.

In some embodiments, the second tip of the second writing instrument may be disposed over (e.g., directly over) the first tip of the first writing instrument. A second non-writing end of the second writing instrument may be disposed over a third non-writing end of the third writing instrument. The third tip of the third writing instrument may be disposed over a first non-writing end of the first writing instrument.

In some embodiments, lengths of the first, second, and third writing utensils may be equal or substantially equal. In some embodiments, lengths of at least two writing utensils may be equal or substantially equal. Here, substantially refers to a difference of no more than +/− one percent, five percent, or any numerical value of less than or equal to ten percent. In some embodiments, a length of at least one writing utensil may be different from one or more lengths of the other writing utensils.

In some embodiments, tips of one or more writing instruments may be removable, retractable, and/or adjustable. For example, tips may be adjustable in color, thickness, degree of sharpness, or a type (e.g., chisel or bullet tip).

In some embodiments, a first distance between the first tip and the second tip is less than a second distance between the second tip and the third tip; the second tip and the third tip are positioned to contact one or more drawing surfaces if a size of a drawing is at least a threshold size; and the first tip and the second tip are positioned to contact the one or more drawing surfaces or other one or more drawing surfaces if the size of the drawing is less than the threshold size, wherein the threshold size is determined based on the first distance or the second distance In some embodiments, a tip of one of the writing instruments may differ in color, thickness, degree of sharpness, and/or type from that of at least one other writing instrument.

In some embodiments, methods for reproducing or replicating drawings may include, positioning a first tip of a first writing instrument onto a first surface, positioning a second tip of a second writing instrument onto the first surface or onto a second surface, and manipulating or moving the first tip to create or copy a sketch or drawing onto the first surface, wherein the second tip contacts the first surface or the second surface and replicates the sketch or drawing in response to the manipulating or moving of the first tip. In some embodiments, the methods may include fastening the first writing instrument to the second writing instrument via any attachment or fastening mechanism, such as a rubber band, a spring, tape, or a pin. In some embodiments, the methods may include fastening a third writing instrument to the second writing instrument and/or to the first writing instrument using the any attachment or fastening mechanism.

In some embodiments, the methods may include moving, drawing, or tracing the first tip along an existing drawing or sketch on the first surface such that the second tip contacts the first surface or the second surface to replicate the existing drawing or sketch.

In some embodiments, the methods may include positioning the third writing instrument away from the first surface and/or the second surface, such that a third tip of the third writing instrument does not contact the first surface and/or the second surface.

In some embodiments, the methods may include positioning the third writing instrument onto a third surface to contact the third surface, wherein the third surface is non-coplanar and nonparallel with respect to the first surface and the second surface. In some embodiments, in response to manipulating or moving the first tip, the third tip contacts the third surface and replicates the sketch or drawing.

In some embodiments, the methods may include disposing or positioning the second tip of the second writing instrument over the first tip of the first writing instrument. In some embodiments, the methods may include disposing or positioning a second non-writing end of the second writing instrument over a third non-writing end of the third writing instrument. In some embodiments, the methods may include disposing or positioning the third tip of the third writing instrument over a first non-writing end of the first writing instrument.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1A:
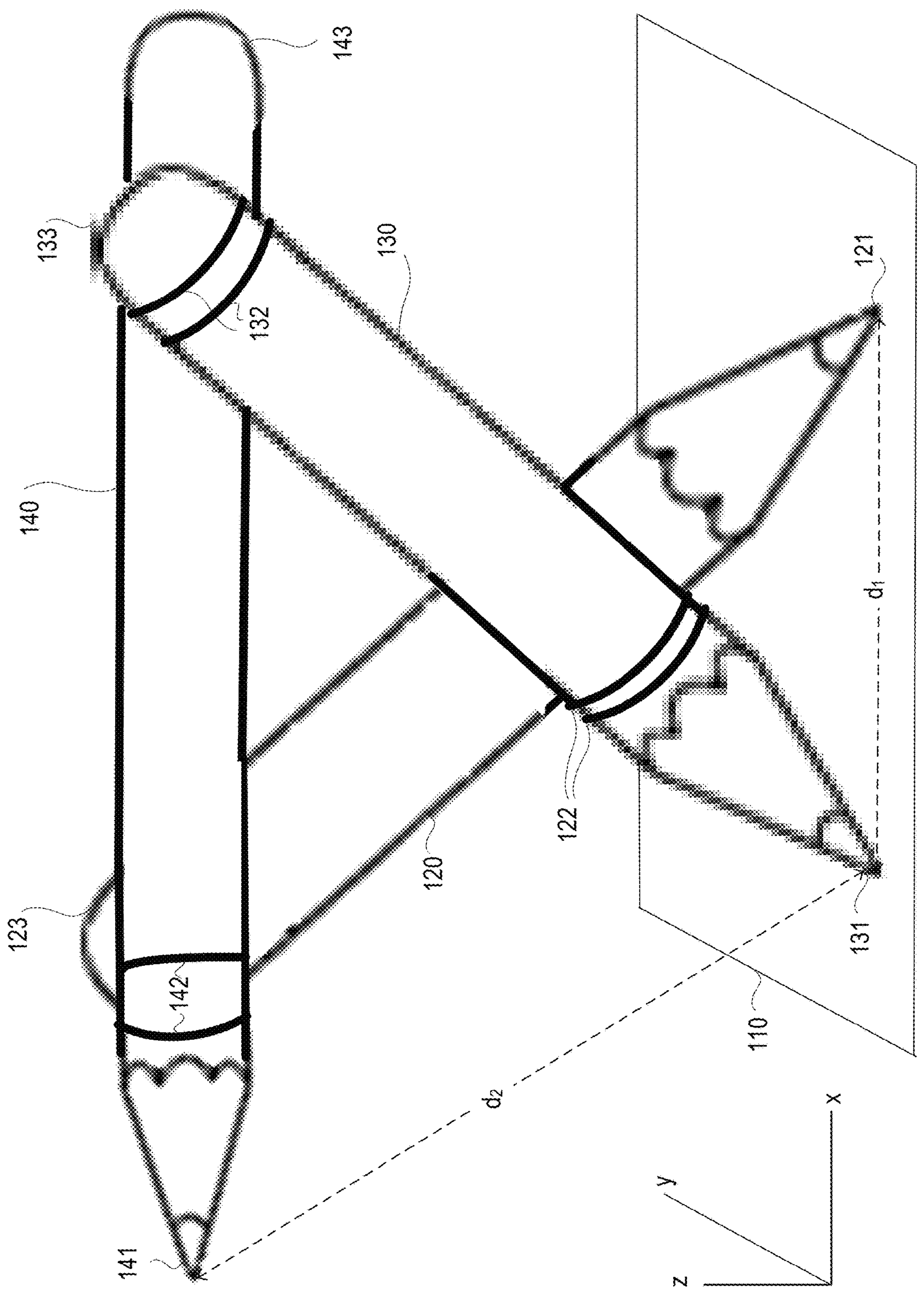
FIGS. 1A, 1B, 1C, 2, and 3 illustrates an example system or apparatus for reproducing or replicating drawings, according to some embodiments of the present disclosure.

FIG. 1A illustrates a scenario in which two writing instruments are positioned to contact a common surface, and a drawing is replicated in two different positions on the common surface. In FIG. 1A, the drawing may be newly created, and may not have previously been present on the common surface. In FIG. 1A, a first writing instrument 120 may be fastened or attached to a second writing instrument 130 via one or more fasteners 122. The fasteners 122 may include, for example, rubber bands, springs, tapes, and/or pins. A third writing instrument 140 may be fastened or attached to the first writing instrument 120 and the second writing instrument 130 via one or more fasteners 142 and one or more fasteners 132. Having three writing instruments attached or fastened to one another, rather than only two, not only provides additional options to replicate drawings, but also, further secures the positions of the writing instruments during drawing. The first and second writing instruments 120 and 130 may be positioned to contact a surface 110. The surface 110 may be oriented along a xy-plane. In FIG. 1A, the x-direction refers to a horizontal direction, the y-direction refers to a direction into the page, and the z-direction refers to a vertical direction. The first writing instrument 120 may include a first tip 121 and a first end 123 opposite the first tip 121. The first tip 121 (or any tip) may refer to or include a drawing or writing tip. The second writing instrument 130 may include a second tip 131 and a second end 133 opposite the second tip 131. The third writing instrument 140 may include a third tip 141 and a third end 143 opposite the third tip 141. In some examples, an end may refer to a non-writing end or portion. In other examples, an end may refer to a second writing tip of a writing instrument. Thus, the writing instruments 120, 130, and/or 140 may each have one or two writing tips.

In some examples, the second tip 131 of the second writing instrument 130 may be disposed over (e.g., in a negative y-direction with respect to) the first tip 121 of the first writing instrument 120. In some examples, the second end 133 of the second writing instrument 130 may be disposed over the third end 143 of the third writing instrument 140. The third tip 141 of the third writing instrument 140 may be disposed over the first end 123 of the first writing instrument 120. Such an arrangement among three writing instruments 120, 130, and 140 will preserve weight balance and stability.

In some examples, the first tip 121 of the first writing instrument 120 may be disposed over the second tip 131 of the second writing instrument. Then, to preserve weight balance and stability, the third end 143 of the third writing instrument 140 may be disposed over the second end 133 of the second writing instrument 130. The first end 123 of the first writing instrument 120 may be disposed over the third tip 141 of the third writing instrument 140.

In some examples, any first plane defined by the first tip 121 and the second tip 131 (e.g., any plane that includes the first tip 121 and the second tip 131) may be nonparallel with any second plane defined by the second tip 131 and the third tip 141 (e.g., any plane that includes the second tip 131 and the third tip 141). Any third plane defined by the first tip 121 and the third tip 141 (e.g., any plane that includes the first tip 121 and the third tip 141) may be nonparallel with any first plane and any second plane.

In some examples, a first point at which the first writing instrument 120 is fastened to the second writing instrument 130 is in proximity of the first tip 121 and the second tip 131. For example, the first point may be at least a first threshold percent of a distance from the first end 123 to the first tip 121, or a second threshold percent of a distance from the second end 133 to the second tip 131. In some examples, the first and/or second threshold percent may be 75 percent, 80 percent, 85 percent, 90 percent, or any percentage at or above 75 percent. In some examples, a second point at which the second writing instrument 130 is fastened to the third writing instrument 140 is in proximity of the second end 133 and the third end 143. For example, the second point may be at most a third threshold percent of a distance from the second end 133 to the second tip 131, or a fourth threshold percent of a distance from the third end 143 to the third tip 141. In some examples, the third and/or fourth threshold percent may be 25 percent, 20 percent, 15 percent, 10 percent, or any percentage at or below 25 percent. In some examples, a third point at which the first writing instrument 120 is fastened to the third writing instrument 140 is in proximity of the first end 123 and the third tip 141. For example, the third point may be at most a third threshold percent of a distance from the first end 123 to the first tip 121, or from the third tip 141 to the third end 143. In some examples, the third threshold percent may be 25 percent, 20 percent, 15 percent, 10 percent, or any percentage at or below 25 percent. These threshold percentages maintain stability and secure fastening of the first writing instrument 120, the second writing instrument 130, and the third writing instrument 140, during writing or drawing.

In some examples, a first distance (e.g., a straight line distance) $d_1$ between the first tip 121 and the second tip 131 is less than a second distance (e.g., a straight line distance) $d_2$ between the second tip 131 and the third tip 141. If a size of a drawing is less than a threshold size, then the first tip 121 and the second tip 131 are positioned to contact one or more drawing surfaces (e.g., the surface 110 as illustrated in FIG. 1, or surfaces 150 and 160 in FIG. 2. If the size of the drawing is at least the threshold size, then the second tip 131 and the third tip 141 would be positioned to contact the one or more drawing surfaces or other drawing surfaces (e.g., a surface 115 as illustrated in FIG. 1C). Thus, distances between at least some of the tips (e.g., 121, 131, 141) may be unequal, and tips that are farther apart may be used to replicate or redraw larger drawings while tips that are spaced closer together may be used to replicate or redraw smaller drawings. In some examples, the threshold size may be equal to $d_1$, or some percentage (under 100 percent) of $d_1$, such as 25 percent, 50 percent, and 75 percent. Therefore, different tip combinations may be implemented for different sized drawings.

In some examples, the first tip 121, the second tip 131, and/or the third tip 141 may be removable, retractable, and/or adjustable. For example, the first, second and/or third tips 121, 131, and/or 141 may be adjustable in color, thickness, degree of sharpness, or a type (e.g., chisel or bullet tip), or have different color, thickness, degree of sharpness, and/or type. In such a manner, a style of replication may be easily regulated. For example, if a second drawing that is thinner is desired, then the second tip 131 may be adjusted and/or selected to have a thinner tip.

Figure 1B:
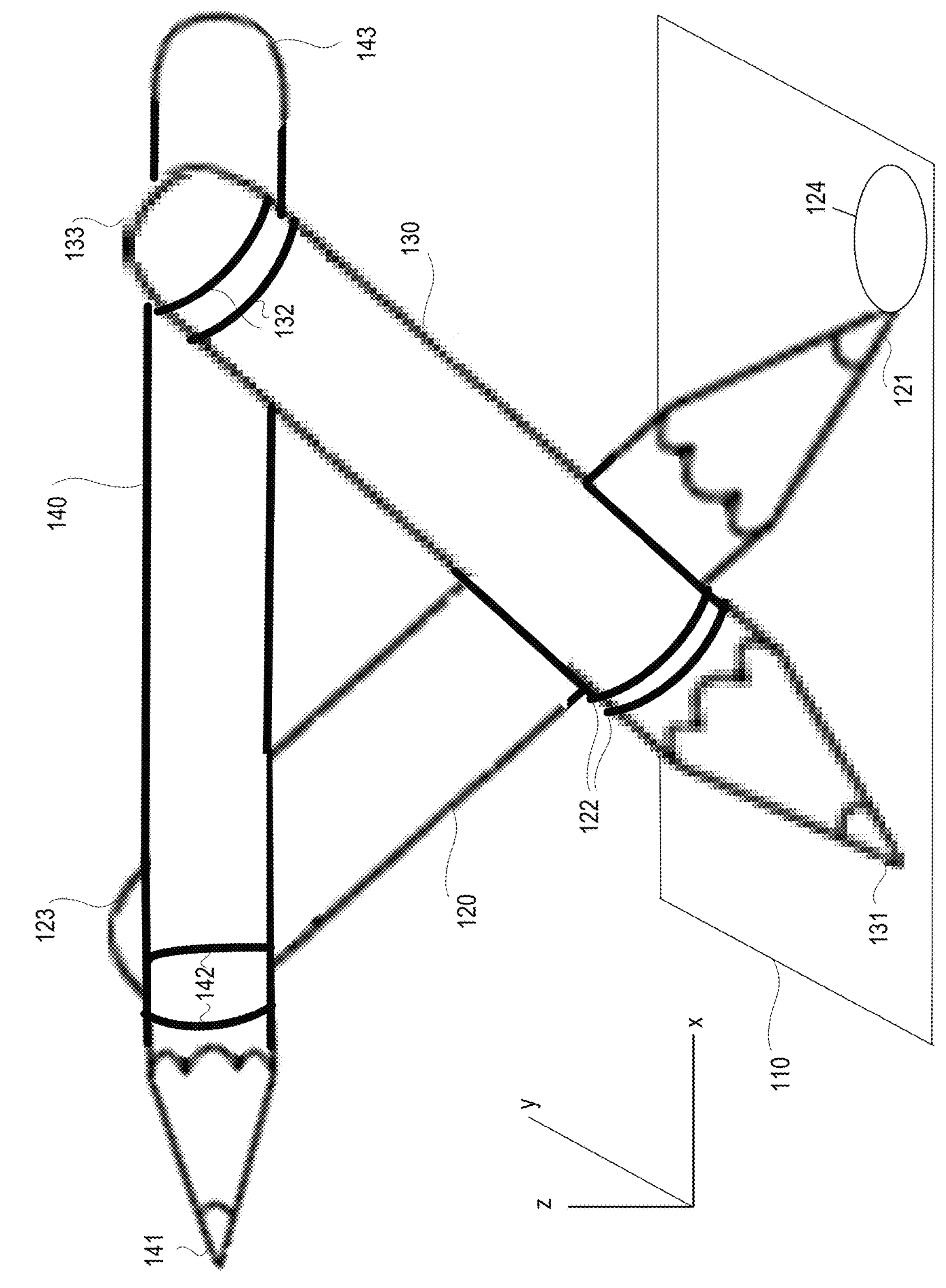
Figure 1C:
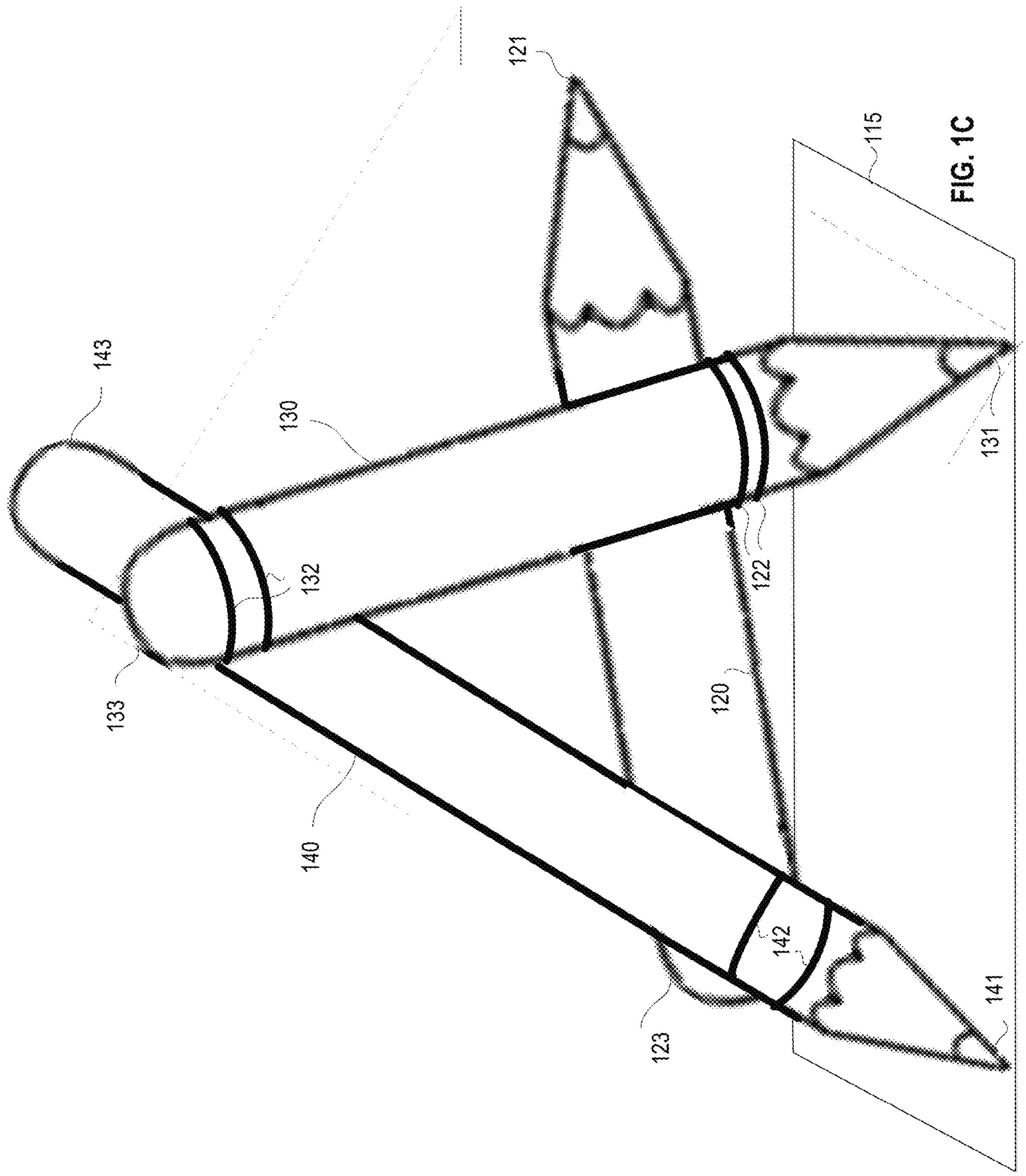

FIG. 1B illustrates that an already existing drawing or sketch 124 (hereinafter "drawing") may be reproduced or copied at another location. Specifically, the first tip 121 may retrace the drawing 124 which causes the second tip 131 to copy the drawing 124.

Figure 2:
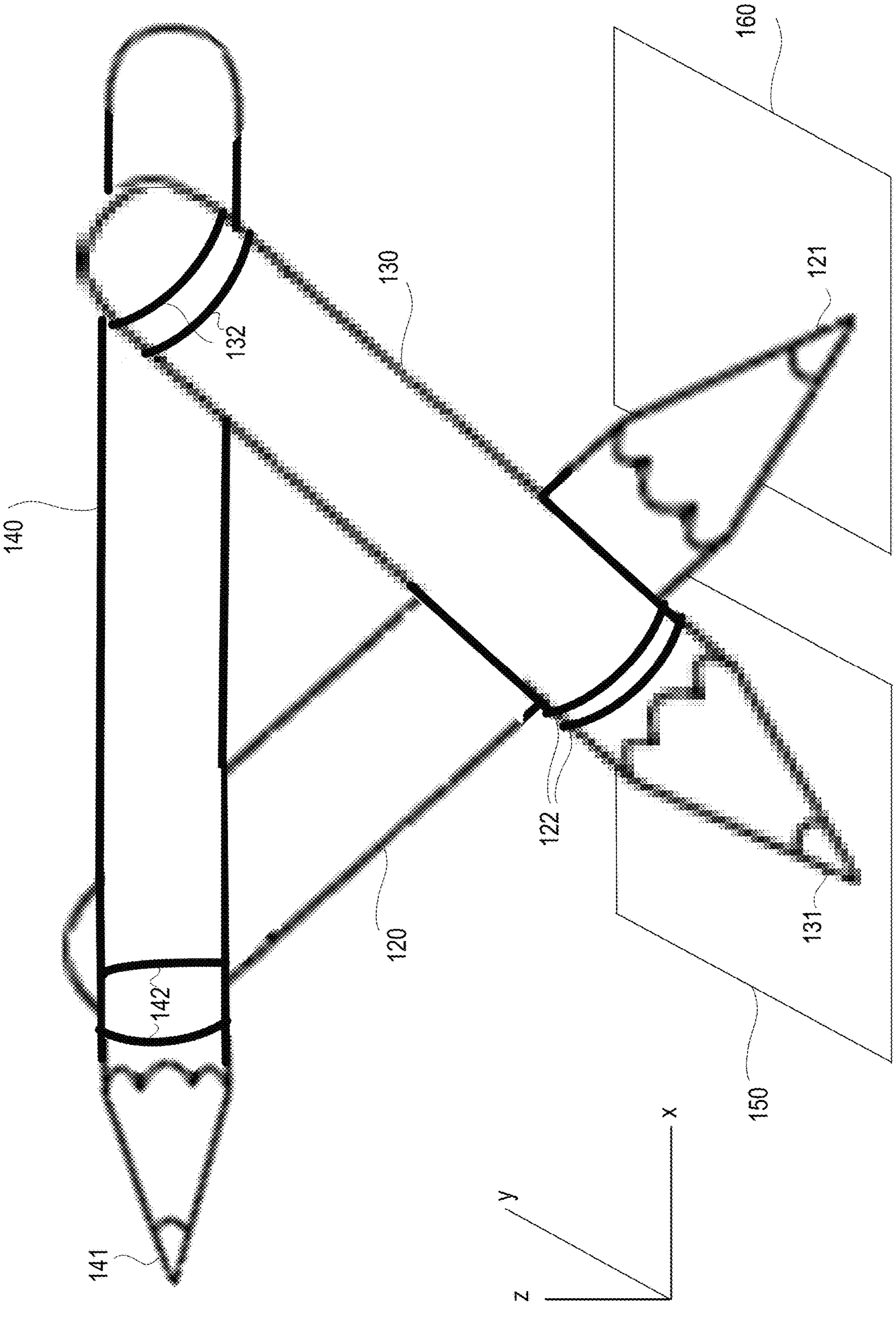

FIG. 2 illustrates a scenario in which two writing instruments are positioned to contact two different surfaces 150 and 160, instead of the common surface 110 as shown in FIG. 1, and a drawing is replicated in two different positions on two different surfaces 150 and 160. The two different surfaces 150 and 160 may be coplanar or parallel, or may be nonparallel. FIG. 2 may be implemented in conjunction with the principle illustrated in FIG. 1B, in order to copy an already existing drawing, for example, on the surface 160.

Figure 3:
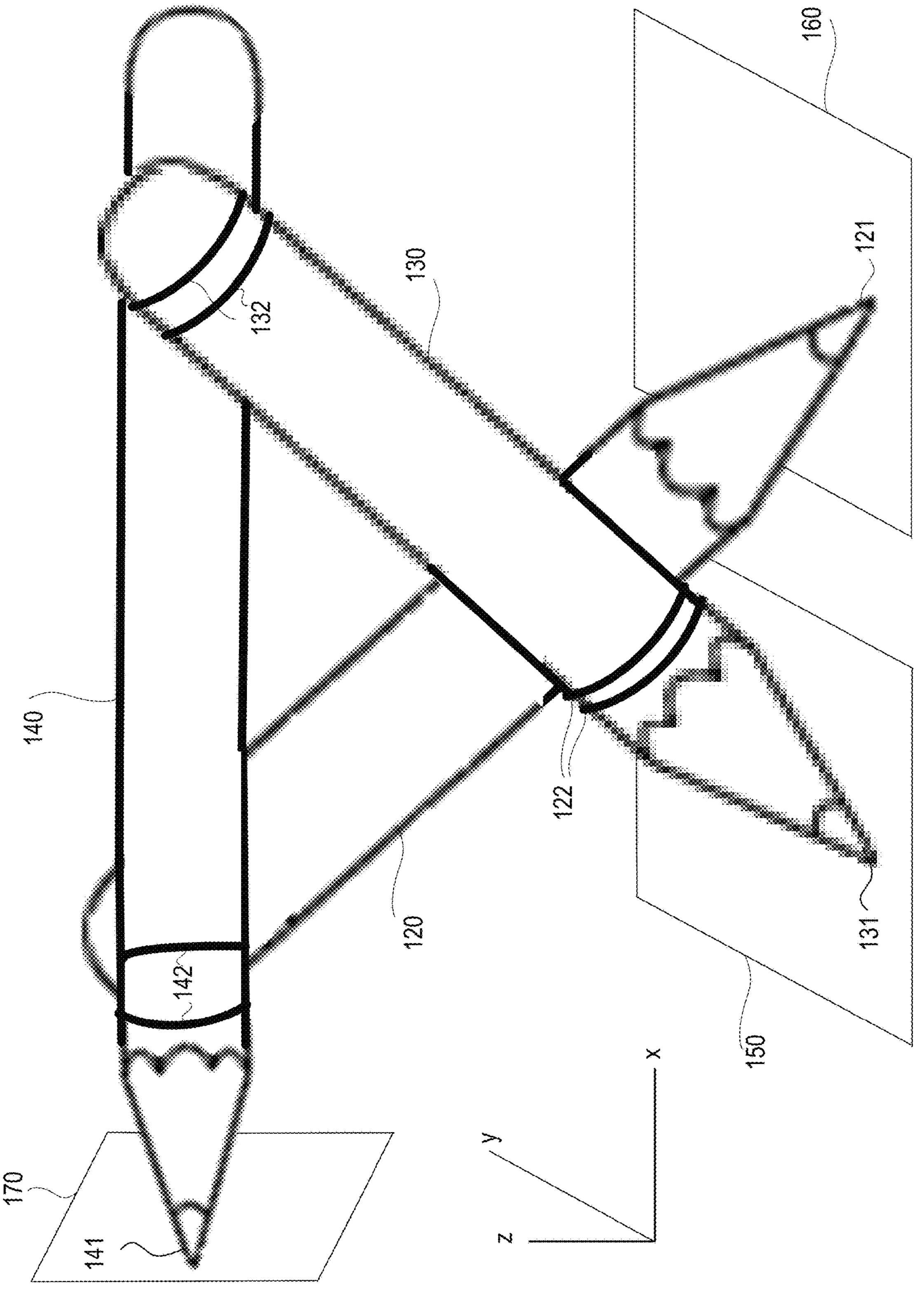

FIG. 3 illustrates a scenario in which three writing instruments are positioned to contact three different surfaces 150, 160, and 170. At least one of the three different surfaces 150, 160, and 170 is noncoplanar or nonparallel with respect to the other surfaces. Here, the surface 170 is nonparallel with respect to the surfaces 150 and 160.

In these examples, a drawing may be replicated onto a common surface or numerous different surfaces, simply by manually drawing only one time. Not only does this apparatus conserve time and effort that would otherwise be consumed by repeating a drawing, but this apparatus also provides flexibility regarding how a drawing is to be replicated, such as, whether the replicated drawing is to be thinner, thicker, have a different color, or other stylistic feature.

Figure 4:
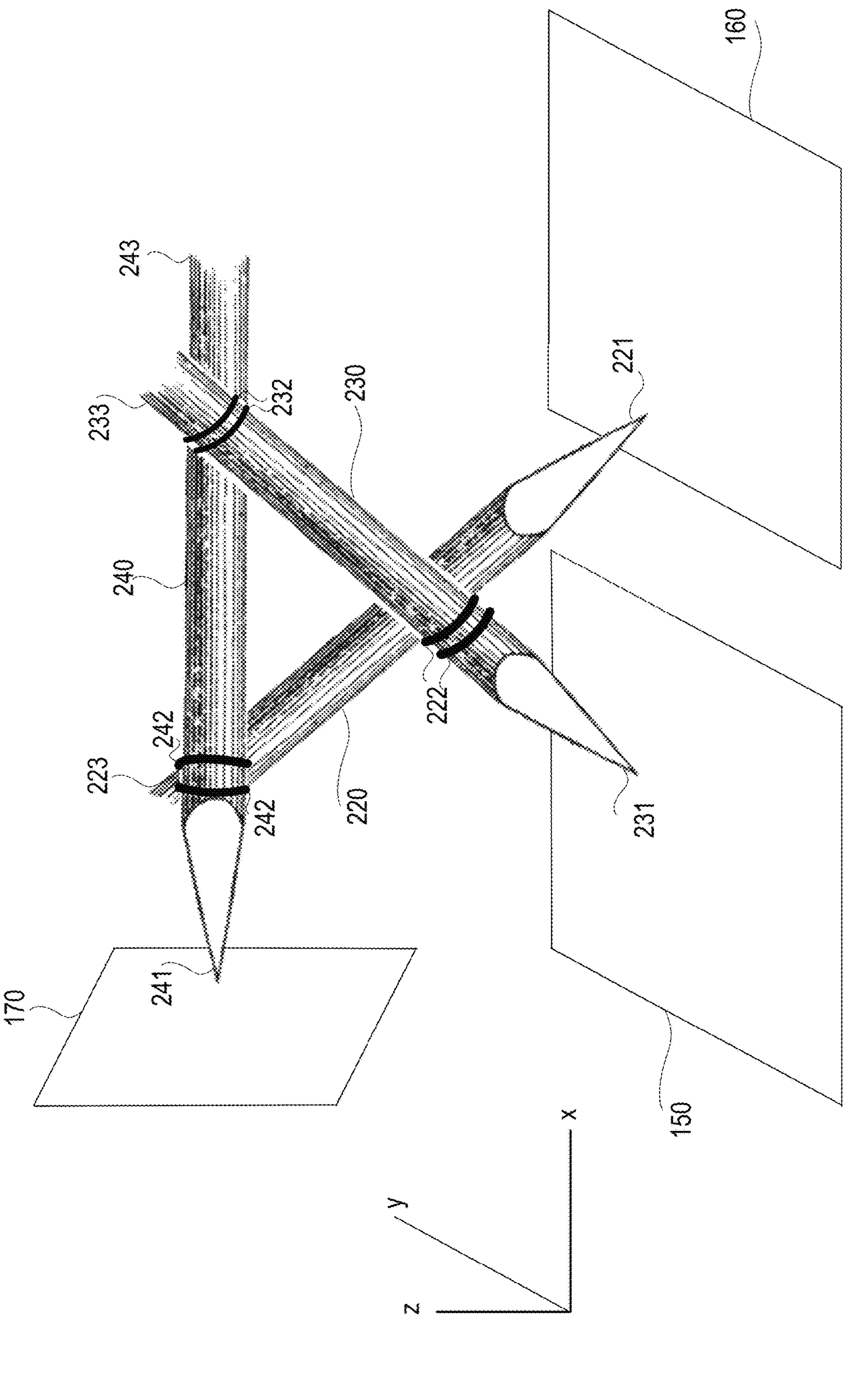
FIG. 4 illustrates an example system or apparatus for reproducing or replicating carvings, according to some embodiments of the present disclosure.

FIG. 4 illustrates a scenario in which three cutting or carving tools or instruments (hereinafter "carving instruments") are positioned to contact the three different surfaces 150, 160, and 170. At least one of the three different surfaces 150, 160, and 170 is noncoplanar or nonparallel with respect to the other surfaces. Here, the surface 170 is nonparallel with respect to the surfaces 150 and 160. Therefore, FIG. 4 may be similar or analogous to FIG. 3, but instead of writing instruments, carving instruments are used to cut or carve different surfaces. In FIG. 4, a first carving instrument 220 may be fastened or attached to a second carving instrument 230 via one or more fasteners 222. The fasteners 222 may include, for example, rubber bands, springs, tapes, and/or pins. A third carving instrument 240 may be fastened or attached to the first carving instrument 220 and the second carving instrument 230 via one or more fasteners 242 and one or more fasteners 232. Having three carving instruments attached or fastened to one another, rather than only two, not only provides additional options to replicate carvings, but also, further secures the positions of the carving instruments during carving.

The first and second carving instruments 220 and 230 may be positioned to contact the surfaces 160 and 150, respectively. The surfaces 160 and 150 may be oriented along a xy-plane. The first carving instrument 220 may include a first tip 221 and a first end 223 opposite the first tip 221. The first tip 221 (or any tip) may refer to or include a drawing or writing tip. The second writing instrument 230 may include a second tip 231 and a second end 233 opposite the second tip 231. The third writing instrument 240 may include a third tip 241 and a third end 243 opposite the third tip 241. In some examples, an end may refer to a non-cutting end or portion. In other examples, an end may refer to a second cutting tip of a carving instrument, or a portion that contains a writing tip. Thus, the carving instruments 220, 230, and/or 240 may each have one or two carving tips, or a writing tip.

Figure 5:
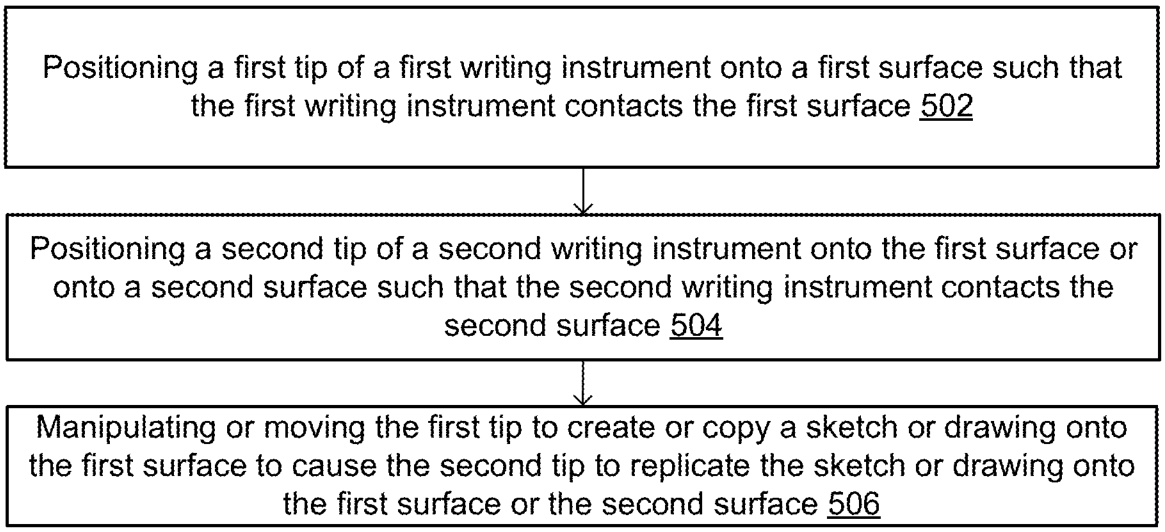
FIG. 5 is a flow chart of a method, according to FIGS. 1A, 1B, 1C, 2, and 3.

FIG. 5 illustrates a flowchart of a method of replicating or reproducing a drawing, in accordance with the FIGS. 1A, 1B, 1C, 2, and 3 presented above. Step 502 includes, positioning a first tip (e.g., 121) of a first writing instrument (e.g., 120) onto a first surface (e.g., 110 or 160) such that the first writing instrument contacts the first surface. Step 504 includes, positioning a second tip (e.g., 131) of a second writing instrument (e.g., 130) onto the first surface or onto a second surface (e.g., 110 or 150) such that the second writing instrument contacts the second surface. Step 506 includes, manipulating or moving the first tip to create a sketch or drawing onto the first surface to cause the second tip to replicate the sketch or drawing onto the first surface or the second surface. Alternatively, the manipulating or moving of the first tip may copy, retrace or redraw an already existing sketch or drawing on the first surface, and the second tip may replicate the already existing drawing or sketch onto the first surface or the second surface. Thus, any movement or motion of the first tip would be replicated by the second tip, and any action performed by the first tip would be repeated by the second tip.

The invention claimed is:

1. Three drawing or carving instruments, wherein:

the three drawing or carving instruments are attached to one another via a fastener between each pair of drawing or carving instruments; and a first fastener, a second fastener, and a third fastener attached to a first drawing or carving instrument, a second drawing or carving instrument, and a third drawing or carving instrument, wherein:

the first drawing or carving instrument is fastened to the second drawing or carving instrument via the first fastener;

the first drawing or carving instrument is fastened to the third drawing or carving instrument via the second fastener;

the second drawing or carving instrument is fastened to the third drawing or carving instrument via the third fastener;

a first tip of the first drawing or carving instrument is oriented between 0 and 180 degrees with respect to a second tip of the second drawing or carving instrument;

a third tip of the third drawing or carving instrument is oriented between 0 and 180 degrees with respect to the first tip of the first drawing or carving instrument and with respect to the second tip of the second drawing or carving instrument, wherein:

the second tip comprises a brush and the third tip comprises a carving instrument;

the fastening of the first drawing or carving instrument to the third drawing or carving instrument is at a position of at most 25 percent of a distance from a first end of the first drawing or carving instrument to the first tip of the first drawing or carving instrument, and at most 25 percent of a distance from a third tip of the third drawing or carving instrument to the third end of the third drawing or carving instrument;

a first point at which the first drawing or carving instrument is fastened to the second drawing or carving instrument is at least 75 percent of a distance from a first end of the first drawing or carving instrument to the first tip of the first drawing or carving instrument;

a second point at which the second drawing or carving instrument is fastened to the third drawing or carving instrument is at most 25 percent of a distance from a second end of the second drawing or carving instrument to the second tip of the second drawing or carving instrument;

a first plane defined by the first tip and the second tip is non-coplanar with a second plane defined by the first tip and the third tip;

the first tip of the first drawing or caving instrument is positioned to contact a first surface;

the second tip of the second drawing or carving instrument is positioned to contact a second surface;

the third tip of the second drawing or carving instrument is positioned to contact a third surface;

the first tip is manipulated or moved to copy a painting onto the second surface; and the painting is automatically replicated onto the third surface as a carving in response to the manipulating or moving of the first tip.

2. The three drawing or carving instruments of claim 1, wherein at least a portion of the third drawing or carving instrument is attached between non-writing ends of the first drawing or carving instrument and the second drawing or carving instrument.

3. The three drawing or carving instruments of claim 1, wherein:

the third drawing or carving instrument is positioned to contact a third surface, wherein the third surface is non-coplanar and nonparallel with respect to the first surface and the second surface;

the second tip of the second drawing or carving instrument is disposed over the first tip of the first drawing or carving instrument;

the second end of the second drawing or carving instrument is disposed over the third end of the third drawing or carving instrument; and the third tip of the third drawing or carving instrument is disposed over the first end of the first drawing or carving instrument.

4. The three drawing or carving instruments of claim 1, wherein the first tip of the first drawing or carving instrument differs in thickness compared to the second tip of the second drawing or carving instrument.

5. The three drawing or carving instruments of claim 1, wherein the first tip of the first drawing or carving instrument differs in a degree of sharpness compared to the second tip of the second drawing or carving instrument.

6. A method comprising:

fastening a first drawing or carving instrument to a second drawing or carving instrument via a first fastener;

fastening a third drawing or carving instrument to the first drawing or carving instrument via a second fastener; and fastening the third drawing or carving instrument to the second drawing or carving instrument via a third fastener, wherein:

the fastening of the first drawing or carving instrument to the second drawing or carving instrument comprises orienting a first tip of the first drawing or carving instrument between 0 and 180 degrees with respect to a second tip of the second drawing or carving instrument;

the fastening of the third drawing or carving instrument to the first drawing or carving instrument comprises orienting a third tip of the third drawing or carving instrument between 0 and 180 degrees with respect to the first tip of the first drawing or carving instrument, and such that a first plane defined by the first tip and the second tip is non-coplanar with a second plane defined by the first tip and the third tip, wherein:

the second tip comprises a brush and the third tip comprises a carving instrument;

the fastening of the first drawing or carving instrument to the third drawing or carving instrument is at a position of at most 25 percent of a distance from a first end of the first drawing or carving instrument to the first tip of the first drawing or carving instrument, and at most 25 percent of a distance from a third tip of the third drawing or carving instrument to the third end of the third drawing or carving instrument:

a first point at which the first drawing or carving instrument is fastened to the second drawing or carving instrument is at least 75 percent of a distance from a first end of the first drawing or carving instrument to the first tip of the first drawing or carving instrument;

a second point at which the second drawing or carving instrument is fastened to the third drawing or carving instrument is at most 25 percent of a distance from a second end of the second drawing or carving instrument to the second tip of the second drawing or carving instrument; and the fastening of the third drawing or carving instrument to the second drawing or carving instrument comprises orienting the third tip of the third drawing or carving instrument between 0 and 180 degrees with respect to the second tip of the second drawing or carving instrument;

positioning the first tip of the first drawing or caving instrument to contact a first surface;

positioning the second tip of the second drawing or carving instrument to contact a second surface;

positioning the third tip of the third drawing or carving instrument to contact a third surface;

manipulating or moving the first tip to copy a painting on the first surface; and automatically replicating the drawing or the carving as a painting onto the second surface and as a carving on the third surface in response to the manipulating or moving of the first tip.

7. The method of claim 6, wherein at least a portion of the third drawing or carving instrument is attached between the first end of the first drawing or carving instrument and the second end of the second drawing or carving instrument.

8. The method of claim 7, further comprising positioning the third drawing or carving instrument to contact a third surface, wherein the third surface is non-coplanar and non-parallel with respect to the first surface and the second surface.

9. The method of claim 7, further comprising:

positioning the second tip of the second drawing or carving instrument over the first tip of the first drawing or carving instrument;

positioning the third tip of the third drawing or carving instrument over the first end of the first drawing or carving instrument; and positioning the second end of the second drawing or carving instrument over the third end of the third drawing or carving instrument.

10. The method of claim 7, further comprising:

adjusting a sharpness of the first tip of the first drawing or carving instrument to be different from that of the second tip of the second drawing or carving instrument.

11. The method of claim 7, further comprising:

adjusting a thickness of the first tip of the first drawing or carving instrument to be different from that of the second tip of the second drawing or carving instrument.

* * * * *